US012673270B2

(12) United States Patent
Lin et al.

(10) Patent No.: US 12,673,270 B2
(45) Date of Patent: Jul. 7, 2026

(54) METHOD FOR PROCESSING INFORMATION IN GAME, APPARATUS, AND ELECTRONIC DEVICE

(71) Applicant: NETEASE (HANGZHOU) NETWORK CO., LTD., Hangzhou (CN)

(72) Inventors: Shouwei Lin, Hangzhou (CN); Peng Wang, Hangzhou (CN); Shuai Qiao, Hangzhou (CN)

(73) Assignee: NETEASE (HANGZHOU) NETWORK CO., LTD., Hangzhou (CN)

( * ) Notice: Subject to any disclaimer, the term of this patent is extended or adjusted under 35 U.S.C. 154(b) by 280 days.

(21) Appl. No.: 18/556,381

(22) PCT Filed: May 13, 2021

(86) PCT No.: PCT/CN2021/093626
§ 371 (c)(1),
(2) Date: Oct. 20, 2023

(87) PCT Pub. No.: WO2022/222208
PCT Pub. Date: Oct. 27, 2022

(65) Prior Publication Data
US 2024/0181355 A1 Jun. 6, 2024

(30) Foreign Application Priority Data

Apr. 22, 2021 (CN) .......................... 202110439820.0

(51) Int. Cl.
*A63F 13/795* (2014.01)
*A63F 13/80* (2014.01)
(52) U.S. Cl.
CPC ............ *A63F 13/795* (2014.09); *A63F 13/80* (2014.09)

(58) Field of Classification Search
None
See application file for complete search history.

(56) References Cited

U.S. PATENT DOCUMENTS 11,007,439 B1 * 5/2021 Pineda .................. A63F 13/847
2003/0224856 A1 12/2003 Bukovsky et al.
(Continued)

FOREIGN PATENT DOCUMENTS

CN 102184333 A 9/2011
CN 109814955 A 5/2019
(Continued)

OTHER PUBLICATIONS

International Search Report dated Jan. 17, 2022 of International Application No. PCT/CN2021/093626.
(Continued)

*Primary Examiner* — Ronald Laneau
(74) *Attorney, Agent, or Firm* — Qinghong Xu

(57) ABSTRACT

A method for processing information in a game includes determining, in response to gaming data information in a current game season satisfying a preset season progress condition, target player characters, for entering a preset gaming system, from player characters, the target player characters include a first target player character having a first identity and a second target player character having a second identity; accepting, in response to an opening condition of the preset gaming system being satisfied, the target player character to access the preset gaming system, the preset gaming system is used for providing a battle environment for a battle between the first target player character and the second target player character; and performing season settlement for the current game season in response to a result of the battle satisfying a preset settlement condition.

20 Claims, 3 Drawing Sheets

(56) References Cited

U.S. PATENT DOCUMENTS

| | | | | |
|---|---|---|---|---|
| 2011/0184248 A1* | 7/2011 | Furuta | .................. | A63F 13/212 |
| | | | | 600/300 |
| 2011/0275431 A1 | 11/2011 | Hirzel et al. | | |
| 2016/0354698 A1 | 12/2016 | Gotkin | | |
| 2017/0106292 A1 | 4/2017 | Stephenson, Jr. et al. | | |
| 2021/0060438 A1 | 3/2021 | Oe et al. | | |
| 2024/0181355 A1* | 6/2024 | Lin | ....................... | A63F 13/795 |
| 2024/0269560 A1* | 8/2024 | Lin | ........................ | A63F 13/42 |

FOREIGN PATENT DOCUMENTS

| | | | |
|---|---|---|---|
| CN | 110111149 A | 8/2019 |
| CN | 110124321 A | 8/2019 |
| CN | 110201402 A | 9/2019 |
| CN | 112546634 A | 3/2021 |
| JP | 2014171800 A | 9/2014 |
| JP | 2016073490 A | 5/2016 |
| JP | 2018089341 A | 6/2018 |
| JP | 2019136254 A | 8/2019 |
| JP | 2021041151 A | 3/2021 |

OTHER PUBLICATIONS

1st Office Action dated Feb. 23, 2022 of Chinese Application No. 202110439820.0.
1st Office Action dated Jul. 4, 2023 of Japanese Application No. 2022-525460.

\* cited by examiner

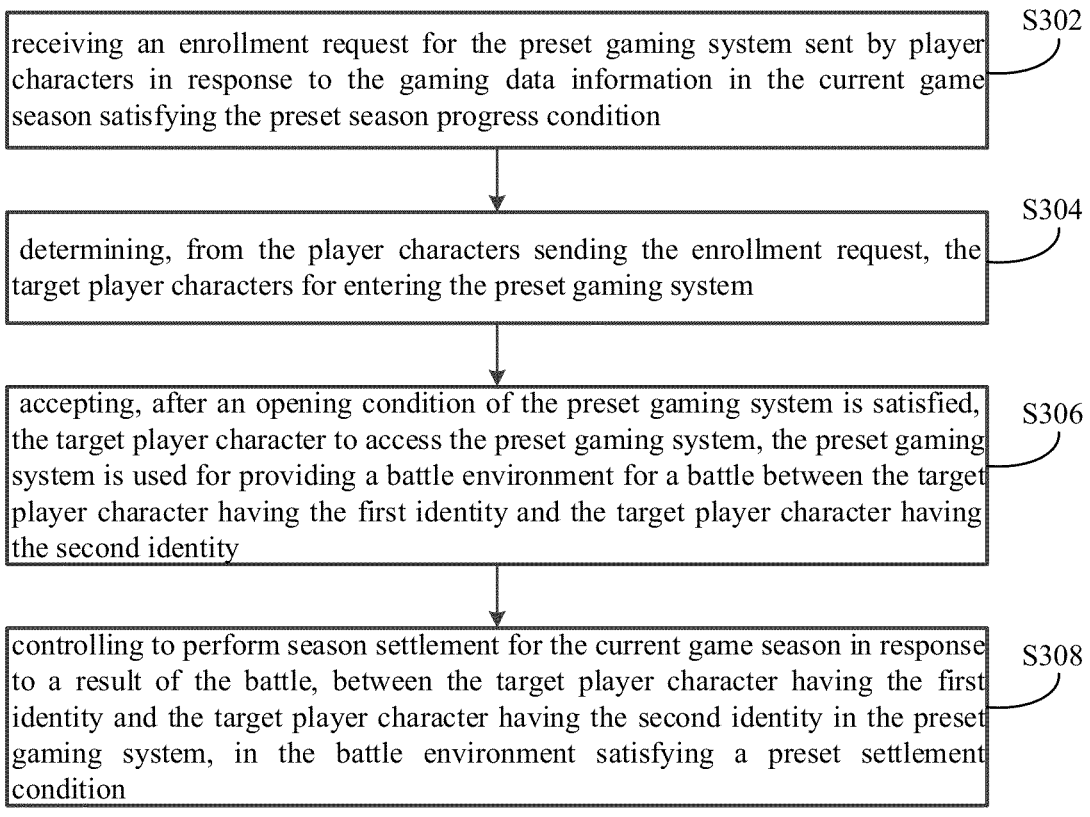

receiving an enrollment request for the preset gaming system sent by player characters in response to the gaming data information in the current game season satisfying the preset season progress condition

S302 determining, from the player characters sending the enrollment request, the target player characters for entering the preset gaming system

S304 accepting, after an opening condition of the preset gaming system is satisfied, the target player character to access the preset gaming system, the preset gaming system is used for providing a battle environment for a battle between the target player character having the first identity and the target player character having the second identity

S306 controlling to perform season settlement for the current game season in response to a result of the battle, between the target player character having the first identity and the target player character having the second identity in the preset gaming system, in the battle environment satisfying a preset settlement condition

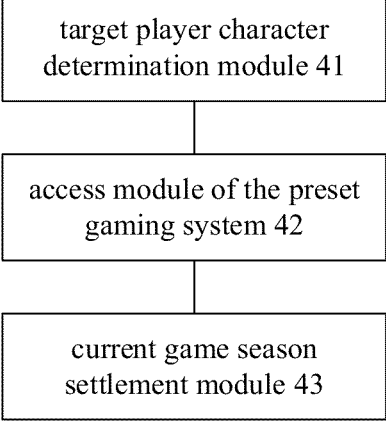

target player character determination module 41 access module of the preset gaming system 42 current game season settlement module 43

FIG. 4

METHOD FOR PROCESSING INFORMATION IN GAME, APPARATUS, AND ELECTRONIC DEVICE

CROSS-REFERENCE TO RELATED APPLICATION

The present application is the U.S. national phase application of PCT Application No. PCT/CN2021/093626, filed on May 13, 2021, which claims the priority to the Chinese Patent Application No. 202110439820.0, entitled "METHOD AND APPARATUS FOR PROCESSING INFORMATION IN GAME, AND ELECTRONIC DEVICE", filed on Apr. 22, 2021, and the entire contents of which are incorporated herein by reference.

TECHNICAL FIELD

The present disclosure relates to the technical field of online games, and in particular, to a method and apparatus for processing information in a game, and an electronic device.

BACKGROUND

In massive multiplayer online (MMO) games, role playing games (RPG), massive/massively multiplayer online role-playing games (MMORPG) and other types of games, season switching is timed or periodic, and players play the game according to a set rhythm during a season. Therefore, there are not many variations in the gaming contents in one season for the players.

However, experiencing the gaming contents in the same season for a long period of time does not provide the players with enough feeling of freshness and has little impact on player behavior. Therefore, it can lead to a decrease in expectations of the players for the season during long-term operation, affecting their long-term retention. The likelihood of losing some players during the season increases greatly, and there is a technical problem of game server resource being consumed for nothing.

It should be illustrated that the information disclosed in the background section above is only used for enhancing the understanding of the background of the present disclosure, and thus may include information that does not constitute prior art known to those ordinary skilled in the art.

SUMMARY

In a first aspect, an embodiment of the present disclosure provides a method for processing information in a game. The game includes a first character camp and a second character camp. The first character camp includes one or more player characters having a first identity. The second character camp includes one or more player characters having a second identity. The method includes determining, in response to gaming data information in a current game season satisfying a preset season progress condition, target player characters, for entering a preset gaming system, from the player characters. The target player characters include a target player character having the first identity and a target player character having the second identity. The method further includes accepting, after an opening condition of the preset gaming system is satisfied, the target player character to access the preset gaming system. The preset gaming system is used for providing a battle environment for a battle between the target player character having the first identity and the target player character having the second identity. The method further includes controlling to perform season settlement for the current game season in response to a result of the battle, between the target player character having the first identity and the target player character having the second identity in the preset gaming system, in the battle environment satisfying a preset settlement condition.

In a second aspect, an embodiment of the present disclosure provides an apparatus for processing information in a game. The game includes a first character camp and a second character camp. The first character camp includes one or more player characters having a first identity. The second character camp includes one or more player characters having a second identity. The apparatus includes a target player character determination module, an access module of the preset gaming system and a current game season settlement module. The target player character determination module is configured to determine, in response to gaming data information in a current game season satisfying a preset season progress condition, target player characters, for entering a preset gaming system, from the player characters. The target player characters include a target player character having the first identity and a target player character having the second identity. The access module of the preset gaming system is configured to accept, after an opening condition of the preset gaming system is satisfied, the target player character to access the preset gaming system. The preset gaming system is used for providing a battle environment for a battle between the target player character having the first identity and the target player character having the second identity. The current game season settlement module is configured to control to perform season settlement for the current game season in response to a result of the battle, between the target player character having the first identity and the target player character having the second identity in the preset gaming system, in the battle environment satisfying a preset settlement condition.

In a third aspect, an embodiment of the present disclosure provides an electronic device. The electronic device includes a processor and a memory. The memory stores a computer-executable instruction that is capable of being executed by the processor. The processor, through executing the computer-executable instruction, implements the steps of the method for processing the information in the game described above.

In a fourth aspect, an embodiment of the present disclosure provides a computer-readable storage medium. The computer-readable storage medium stores a computer-executable instruction. The computer-executable instruction, when scheduled and executed by a processor, causes the processor to implement the steps of the method for processing the information in the game described above.

Other features and advantages of the present disclosure will be set forth in the following description. Alternatively, some of the features and advantages may be inferred or ascertained beyond a reasonable doubt from the specification. Alternatively, some of the features and advantages may be known by implementation of the above-described techniques of the present disclosure.

In order to make the foregoing objectives, features and advantages of the present disclosure more apparent and understandable, the following is a detailed description of the preferred embodiments, together with the accompanying drawings, as set forth below.

It should be understood that the above general description and the detailed description hereinafter are merely exemplary and explanatory, and do not limit the present disclosure.

BRIEF DESCRIPTION OF THE DRAWINGS

In order to more clearly illustrate the technical solutions in the detailed description or prior art of the present disclosure, the following will briefly introduce the accompanying drawings that need to be used in the description of the detailed description or prior art. It is obvious that the accompanying drawings in the following description are some of the embodiments of the present disclosure. For those ordinary skilled in the art, other drawings can be obtained based on these drawings without putting in creative labor.

FIG. 3 is a flowchart of another method for processing information in a game provided by an embodiment of the present disclosure.

FIG. 4 is a schematic structural diagram of an apparatus for processing information in a game provided by an embodiment of the present disclosure.

DETAILED DESCRIPTION

Figure 1:
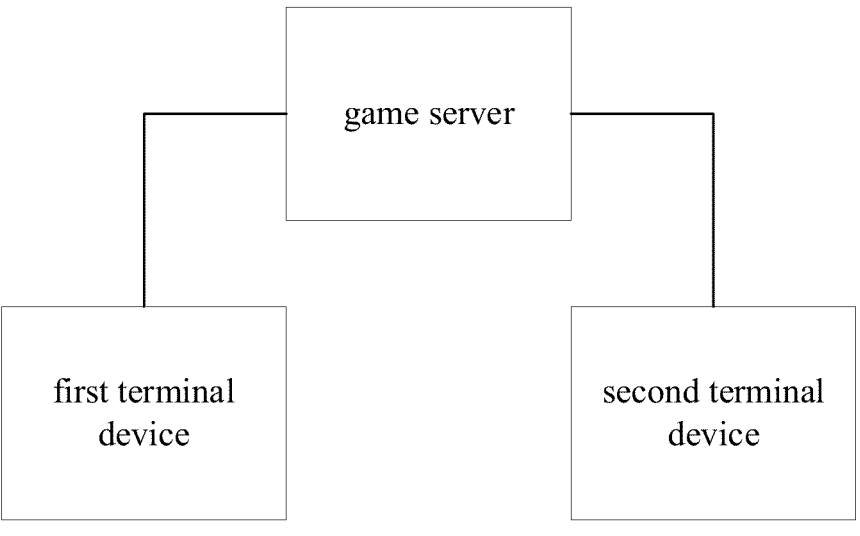
FIG. 1 is a schematic diagram of an implementation environment provided by an embodiment of the present disclosure.

In order to make the purpose, technical solutions and advantages of the embodiments of the present disclosure clearer, the technical solutions of the present disclosure will be described clearly and completely in the following in connection with the accompanying drawings. It is obvious that the described embodiments are part of the embodiments of the present disclosure and not all of the embodiments. Based on the embodiments in the present disclosure, all other embodiments obtained by those ordinary skilled in the art without making creative labor fall within the scope of protection of the present disclosure.

Currently, season switching in some games is timed or periodic, e.g., taking one natural month as a season. The gaming contents are essentially the same in one season and may vary from season to season. However, if a player experiences the same gaming contents all the time in a season, feeling of freshness of the player may be decreased, which leads to a decrease in expectations of the player for the season, increasing the likelihood of losing players, and also leads to a problem of server resource being consumed for nothing. In addition, the gaming progress of different players in a season may be different. For example, part of the players may have essentially completed the gaming task or goal of the season when the season reaches ¾ of the way through, while part of the players has only completed a very small portion of the gaming task or goal of the current season due to a small amount of time invested in the game. For this part of the players that has only completed a very small portion of the gaming task or goal, there is no hope of completing the task or goal of this season. At this point, the players who have already completed the gaming task or goal, as well as the players who have no hope of completing the gaming task of this season, may want to quickly enter the next season and start a new gaming experience. However, existing gaming systems lack the technology to dynamically adjust overall progress of the game according to gaming situation of the season.

First, the terms involved in the present disclosure are introduced.

(1) Preset Gaming System

A preset gaming system may provide a virtual scene that is displayed (or provided) when an application program runs on a terminal or server. In some embodiments, the virtual scene is a simulation environment of the real world, a semi-simulation and semi-fiction virtual environment, or a purely fictional virtual environment. The virtual scene is any one of a two-dimensional virtual scene or a three-dimensional virtual scene. The virtual environment may be the sky, land, ocean, etc. The land includes environmental elements such as deserts and cities. The virtual scene is the scene where virtual objects such as the user controls to complete the gaming logic.

The virtual object is a dynamic object that is capable of being controlled in the virtual scene. In some embodiments, the dynamic object may be a virtual character, a virtual animal, and the like. The virtual character includes anime characters, game characters, and the like. The virtual object is a character controlled by a player through an input device, an artificial intelligence (AI) provided in a virtual battle scene through training, or a non-player character (NPC) provided in the virtual battle scene. In some embodiments, the virtual object is a virtual character that competes in the virtual scene. In some embodiments, the number of the virtual objects in the virtual battle scene is preset, or is dynamically determined according to the number of clients joining the battle, and the embodiments of the present disclosure are not limited thereto. In one possible embodiment, a user is capable of controlling the virtual object to move in the virtual scene, for example, controlling the virtual object to run, jump, crawl, etc., and the user is also capable of controlling the virtual object to battle with other virtual objects by using skills, virtual props, etc. provided by the application program.

(2) Player Character

A player character is a virtual object that is capable of being controlled by a player to move in the gaming environment, which may also be called the shikigami character or hero character in some electronic games. The player character may be at least one of the different forms of virtual characters, virtual animals, anime characters, virtual vehicles and so on.

Gaming Interface

A gaming interface is an interface corresponding to the application program provided or displayed through a graphical user interface. The gaming interface includes a user interface (UI) for the players to interact and a gaming footage. In an embodiment, the UI may include game controls (e.g., skill controls, movement controls, function controls, etc.), indicator signs (e.g., direction indicator signs, character indicator signs, etc.), an information display area (e.g., the number of kills, time of the competition, etc.), or game setup controls (e.g., the system setup, store, gold, etc.). In an embodiment, the gaming footage is a display footage corresponding to a virtual scene displayed by the terminal device. The gaming footage may include virtual objects such as game characters, NPC characters and AI characters that perform the gaming logic in the virtual scene.

Based on this, the embodiments of the present disclosure provide a method and apparatus for processing information in a game, and an electronic device. This technology of the present disclosure may be applied to a computer, a cell phone, a tablet computer, a server, and other devices that may realize human-computer interaction, and in particular, may be applicable to a scenario of a computer game or a cell phone game.

To facilitate the understanding of the embodiments of the present disclosure, a detailed introduction is first given to a method for processing information in a game disclosed by the embodiments of the present disclosure.

The method for processing information in a game provided in one of the embodiments of the present disclosure may run on a terminal device or a server. The terminal device may be a local terminal device. When the method for processing information in a game runs on a server, the method can be implemented and executed based on a cloud interaction system. The cloud interaction system includes the server and a client device.

In an embodiment of the present disclosure, various cloud applications, e.g., cloud games, may run under the cloud interaction system. Taking the cloud game as an example, the cloud game refers to the game mode based on cloud computing. In the operation mode of the cloud game, the operation subject of the game program and the presentation subject of the gaming footage are separated, and the storage and operation of the method for processing the information in the game are completed on the cloud game server. The client device is used for data reception, data transmission and presentation of the gaming footage. For example, the client device may be a display device with a data transmission function near the user side, such as a mobile terminal, TV, computer, PDA, etc. However, the terminal device for processing the information is the cloud game server in the cloud. When the game is performed, the player operates the client device to send an operation instruction to the cloud game server. The cloud game server runs the game according to the operation instruction, encodes and compresses data such as the gaming footage, returns the data to the client device via network, and finally, the client device decodes and outputs the gaming footage.

In an alternative embodiment of the present disclosure, the terminal device may be a local terminal device. Taking the game as an example, the local terminal device stores the game program, which is used for presenting the gaming footage. The local terminal device is used for interacting with the player through the graphical user interface, i.e., routinely downloading and installing the game program via the electronic device and running the game program on the electronic device. The local terminal device may provide the graphical user interface to the player in a variety of ways, for example, the graphical user interface may be rendered on the display of the terminal, alternatively, the graphical user interface may be provided to the player by holographic projection. For example, the local terminal device may include a display and a processor. The display is used for presenting the graphical user interface. The graphical user interface includes the gaming footage. The processor is used for running the game, generating the graphical user interface, and controlling the display of the graphical user interface on the display.

In a possible embodiment, an embodiment of the present disclosure provides a method for processing information in a game. In this embodiment, a graphical user interface is provided via a terminal device. The terminal device may be the local terminal device mentioned above or the client device in the cloud interaction system mentioned above. The graphical user interface is provided via the terminal device. The graphical user interface includes at least a portion of the gaming scene, a player character and other virtual objects in the same matchup. As in the aforementioned embodiments, the player may control the player character to attack the other virtual objects.

Please refer to the schematic diagram of an implementation environment shown in FIG. 1. The implementation environment may include a first terminal device, a game server, and a second terminal device. The first terminal device and the second terminal device communicate with the server to realize data communication, respectively. In this embodiment, the first terminal device and the second terminal device are each installed with a client for executing the method for processing the information in the game provided in the present disclosure. The game server is a server side for executing the method for processing the information in the game provided in the present disclosure. The clients enable the first terminal device and the second terminal device to communicate with the game server respectively.

Taking the first terminal device as an example, the first terminal device establishes communication with the game server through running the client. In an embodiment, the server establishes a gaming matchup based on a gaming request from the client. Parameters of the gaming matchup may be determined based on parameters in the received gaming request. For example, the parameters of the gaming matchup may include the number of people participating in the gaming matchup, the grade of the character participating in the gaming matchup, and the like. When the first terminal device receives a response from the server, a virtual scene corresponding to the gaming matchup is displayed through the graphical user interface of the first terminal device. In an embodiment, the server determines a target gaming matchup for the client from a plurality of established gaming matchups according to the gaming request of the client. When the first terminal device receives the response from the server, the virtual scene corresponding to the gaming matchup is displayed through the graphical user interface of the first terminal device. The first terminal device is a device controlled by a first user. The virtual object displayed in the graphical user interface of the first terminal device is a player character controlled by the first user. The first user inputs operation instructions through the graphical user interface to control the player character to perform corresponding operations in the virtual scene.

Taking the second terminal device as an example, the second terminal device establishes communication with the game server through running the client. In an embodiment, the server establishes a gaming matchup based on a gaming request from the client. Parameters of the gaming matchup may be determined based on parameters in the received gaming request. For example, the parameters of the gaming matchup may include the number of people participating in the gaming matchup, the grade of the character participating in the gaming matchup, and the like. When the second terminal device receives a response from the server, a virtual scene corresponding to the gaming matchup is displayed through the graphical user interface of the second terminal device. In an embodiment, the server determines a target gaming matchup for the client from a plurality of established gaming matchups according to the gaming request of the client. When the second terminal device receives the response from the server, the virtual scene corresponding to the gaming matchup is displayed through the graphical user interface of the second terminal device. The second terminal device is a device controlled by a second user. The virtual object displayed in the graphical user interface of the second terminal device is a player character controlled by the second user. The second user inputs operation instructions through the graphical user interface to control the player character to perform corresponding operations in the virtual scene.

The server performs data calculations based on gaming data reported by the first terminal device and the second terminal device, and synchronizes the calculated gaming data to the first terminal device and the second terminal device, causing the first terminal device and the second terminal device to control, based on the synchronized data sent from the server, the graphical user interface to render the corresponding virtual scene and/or virtual object.

In this embodiment, the virtual object controlled by the first terminal device and the virtual object controlled by the second terminal device are virtual objects in the same gaming matchup. The virtual object controlled by the first terminal device and the virtual object controlled by the second terminal device may have the same character attribute or may have different character attributes.

It should be illustrated that the virtual objects in the current gaming matchup may include two or more virtual objects, and different virtual objects may correspond to different terminal devices. That is, in the current gaming matchup, there are more than two terminal devices respectively sending and synchronizing gaming data with the game server.

This embodiment provides a method for processing information in a game. The game provided by this embodiment includes a first character camp and a second character camp. The first character camp includes one or more player characters having a first identity. The second character camp includes one or more player characters having a second identity.

The game in this embodiment may be an MMO, RPG, MMORPG game. The game in this embodiment may be a cell phone game, a computer game, or a host game. The game in this embodiment may be divided into different game camps, e.g., the first character camp and the second character camp. Each player character may belong to a game camp. Player characters belonging to different character camps may have different identities, for example, a player character belonging to the first character camp has the first identity, and a player character belonging to the second character camp has the second identity.

The player characters belonging to the same character camp may help each other to jointly complete a task of the character camp. The player characters belonging to different character camps may attack each other to complete tasks of their own character camps and to prevent the opponent from completing the task of the character camp of the opponent.

Figure 2:
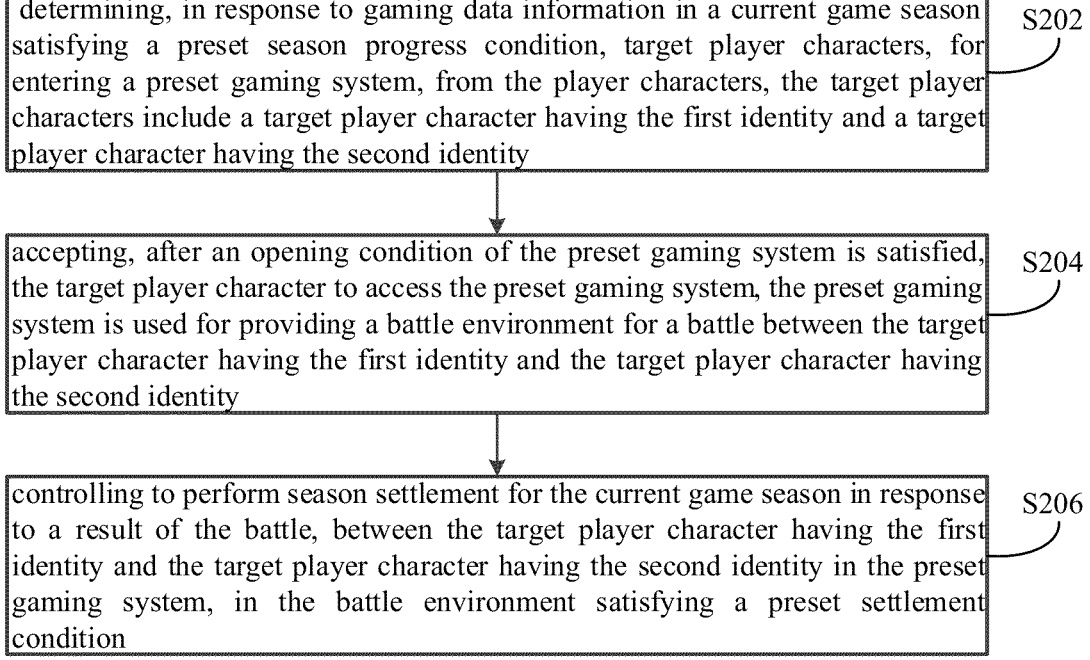
FIG. 2 is a flowchart of a method for processing information in a game provided by an embodiment of the present disclosure.

Referring to a flowchart of a method for processing information in a game shown in FIG. 2, the method for processing the information in the game includes the following steps S202 to S206.

At step S202, target player characters for entering a preset gaming system are determined from the player characters in response to gaming data information in a current game season satisfying a preset season progress condition. The target player characters include a target player character having the first identity and a target player character having the second identity.

The method provided in this embodiment may be applied to a server. The current game season may be understood as the season in which the above-described game is in progress.

In general, the game divides the season by a fixed period of time, e.g., starting the season on the first of each month and terminating the season on the twentieth of each month. The game may provide with different gaming activities in different seasons to give the player different gaming benefits, and the player experiences different gaming contents in different seasons to improve the feeling of freshness of the player for playing the game.

However, the season in this embodiment may not be divided by a fixed period of time. Whether to terminate the season may be determined based on gaming situation of the players in the current game season. If most of the players have already experienced all of the gaming contents in the current game season, then if these players continue to experience the same gaming contents in the current game season, this may lead to a decrease in the feeling of freshness of these players, and thus leading to a loss of part of the players.

For example, each season in the game in this embodiment may provide different equipment for the players to obtain, and the equipment status of the players may be used as a criterion for determining whether to terminate the season. The game may periodically check the ratio of all players obtaining the equipment provided in the season. If most of the players have obtained all the equipment that can be provided in the season, it is considered that most of the players have experienced all the gaming content of the season, and at this time the season may be terminated and the next season may be opened.

The number of battles that the player character can play in a season is generally not limited. The player character may generally obtain a certain season reward after each battle. The season reward may be virtual currency, a virtual prop, a season score, etc. The season score may be generally exchanged for the virtual currency or a virtual prop specific to the season. In order to increase the players' motivation to battle in the season, the contents of the above season reward (e.g., the virtual prop) may be unique to this season.

The preset gaming system may refer to a gaming system in which player characters from different game camps engage in a battle. The result of the battle of individual player characters in the preset gaming system may determine whether to terminate the current game season. A player character that is capable of entering the preset gaming system may be referred to as a target player character. Part of the players may be selected from all the game players as the target player characters. The target player character selected from the player characters of the first character camp is the target player character having the first identity. The target player character selected from the player characters of the second character camp is the target player character having the second identity.

In addition, the game character in this embodiment may change the game camp to which he or she belongs. The player character may join a new game camp by applying for it, completing a designated task of the camp, or the like. For example, in a first season of the game, all player characters belong to neither the first character camp nor the second character camp. A player character may get a task from a designated non-player character (NPC) (different NPCs correspond to either the first character camp or the second character camp), and after completing the task, this player character may join either the first character camp or the second character camp.

In the course of the season, if a player character wants to change the camp, this player character may also go to the NPC to get a task, and after completing the task, this player character may change the camp. Alternatively, a player may apply to a camp leader of the camp he or she wants to change to for changing the camp, and after the camp leader agrees to the application, the player may change the camp.

The camp in this embodiment may include a sub-camp, or may not include a sub-camp. As an example, the first character camp includes a plurality of sub-camps, and the second character camp does not include a sub-camp.

After joining the first character camp, the player character may not choose to join any of the sub-camps, or may join an old sub-camp or create a new sub-camp. The player characters of both the first character camp and the second character camp may carry out daily tasks of the corresponding camp to obtain certain task benefits. The daily tasks may be categorized into tasks in which player characters of the same camp cooperate with each other and tasks in which player characters of different camps fight against each other.

When a season is over, player characters of the winning camp or sub-camp of this season may be changed to a designated camp (e.g., the second character camp), and player characters of the designated camp that lose in this season may be changed to another camp (e.g., the first character camp).

At step 204, after an opening condition of the preset gaming system is satisfied, the target player character is accepted to access the preset gaming system. The preset gaming system is used for providing a battle environment for a battle between the target player character having the first identity and the target player character having the second identity.

The opening condition of the preset gaming system is the condition under which the target player character is capable of entering the preset gaming system and engaging in the battle. The opening condition described above may be: the target player character completing a designated opening task of the preset gaming system. Alternatively, voting is conducted by the target player characters, and whether to open the preset gaming system is determined based on a result of the voting. Alternatively, the server may count the gaming data of the target player characters to determine whether the gaming data such as the grade, experience, equipment, and the like satisfies a certain threshold, and if yes, the preset gaming system may be opened.

After the opening condition of the preset gaming system is satisfied, the preset gaming system may be opened, and at the same time the target player character is accepted to access the preset gaming system. The target player character accessing the preset gaming system may battle in the battle environment of the preset gaming system to obtain a result of the battle. The battle environment may be a room or a battlefield of the preset gaming system. That is, the target player character having the first identity and the target player character having the second identity may battle in the room or the battlefield of the preset gaming system to obtain the result of the battle.

At step 206, season settlement for the current game season is controlled to perform in response to a result of the battle, between the target player character having the first identity and the target player character having the second identity in the preset gaming system, in the battle environment satisfying a preset settlement condition.

The settlement condition described above may be: a ratio of the results of the battle won by the target player character having the first identity or the second identity exceeding a certain threshold, or a designated target player character having the first identity or the second identity in the battle environment failing or being dead, etc. If the result of the battle in the preset gaming system satisfies the settlement condition described above, the current game season may be terminated and the next game season may be prepared to be started.

However, the time to start the next game season may be the same as or different from the time to terminate the current game season. For example, the next game season may be started at the same time as the current game season is terminated, or the current game season may be terminated first, and the winning target player characters may vote to determine when to start the next game season.

In the method for processing the information in the game provided by the embodiments of the present disclosure, the target player characters for entering the preset gaming system are determined from the player characters in response to the gaming data information in the current game season satisfying the preset season progress condition; after the opening condition of the preset gaming system is satisfied, the target player character is accepted to access the preset gaming system; and the season settlement is controlled to perform for the current game season in response to the result of the battle, between the target player character having the first identity and the target player character having the second identity in the preset gaming system, in the battle environment satisfying a preset settlement condition.

In this method, the target player characters may be determined after the gaming data information satisfies the preset season progress condition, and the current game season may be controlled to perform the season settlement when the result of the battle of the target player character in the preset gaming system satisfies the preset settlement condition, thus realizing dynamic season settlement. The start time and end time of each season may be determined according to the result of the battle of the target player character in the preset gaming system, and are not timed or periodic. The season may be terminated before the feeling of freshness of the player for the current season is reduced, so as to improve the experience of the player and the game liveness, make the player stay for a long period of time, reduce the likelihood of losing players, and prevent the game server from being consumed for nothing.

As shown in a flowchart of another method for processing information in a game provided in an embodiment shown in FIG. 3, the method for processing the information in the game provided in the embodiment includes the following steps S302 to S308.

At step S302, an enrollment request for the preset gaming system sent by player characters is received in response to the gaming data information in the current game season satisfying the preset season progress condition.

In some embodiments, the gaming data information in this embodiment may include data of at least part of the player characters, or may also include data of the non-player character. For example, the server may collect various types of data in the current game season, such as the grade situation of the player character, the completion situation of various types of tasks, the duration of the current game season, and the like.

In this embodiment, whether the preset season progress condition is satisfied may be determined based on the collected gaming data information described above. In some embodiments, the season progress condition at least includes one of: a duration of the season exceeding a first threshold; a number of player characters with a grade greater than a preset grade threshold exceeding a second threshold; an average grade of the player characters exceeding a third threshold; a completion progress of a target task of the game exceeding a fourth threshold; camp data of the first character camp and/or the second character camp satisfying a preset condition; or a number of players who have or have not completed the season gaming task or objective, as well as their investment in gaming time.

The duration of the season, as well as the camp data of the first character camp and/or the second character camp are the data of the non-player character. The server may record the start time and present time of the current game season to determine the duration of the current game season. If the duration of the season exceeds the first threshold, it may be considered that the grade, equipment, etc. of the player characters are close to maturity and that the player characters are capable of battling in the preset gaming system. Otherwise, if the grade, equipment, etc. of the players are close to maturity and there is no new gaming content to experience, it may cause losing of players and may cause the server to be consumed for nothing.

The number of player characters with a grade greater than the preset grade threshold, the average grade of the player characters, and the completion progress of the target task of the game may all be considered as the data of the player characters. For example, a total of 10,000 players have logged in during the current game season, of which, a total of 3,000 players are with a grade greater than 60; the average grade of all players is 40; in order to open the preset gaming system, it may be necessary for all players in the game to complete their respective target task, and a total of 2,500 players have completed the target task.

The number of player characters with a grade greater than the preset grade threshold may reflect the number of players that are more active in the game. The players that are more active generally log in frequently during the season to raise their grades and equipment more quickly, and these players may be understood as active players in the game. These active players are generally also the main players who battle in the preset gaming system. Therefore, whether to open the preset gaming system may be determined based on the number of the active players.

The average grade of the player characters may reflect the gaming progress of the players in the game. If the average grade of the player characters is close to an upper limit of the opening grade of the current game season, it may be assumed that many players have already experienced all of the gaming contents in the current game season, and at this time, in order to maintain the feeling of freshness of the players, the preset gaming system may be opened in time, thus preventing losing of players and prevent the server from being consumed for nothing.

If a target task for opening the preset gaming system is provided in the game, the player character needs to complete the target task if he or she wants to open the preset gaming system. Therefore, counting the completion progress of the target task may also indicate the number of players who want to open the preset gaming system in the game. If the completion progress of the target task exceeding the fourth threshold, it may be assumed that the number of players who want to open the preset gaming system is large. At this time, the preset gaming system may be opened in time to satisfy the needs of the players.

In addition, the camp data of the first character camp and/or the second character camp may be understood as a total score (the score may also be referred to as combat capability) of the first character camp and/or the second character camp. In this embodiment, the score of each player character of the first character camp and/or the second character camp may be counted. Scores of each player character of the first character camp are added together to be the total score of the first character camp. Scores of each player character of the second character camp are added together to be the total score of the second character camp.

The score may be calculated as follows. Each of the equipment, grade, skill level, etc. of the player character may have a respective score value and score weight. Multiplying each score value with the corresponding score weight, and then adding the products together to obtain the score of one player character. For example, if the score values of the equipment, grade and skill level of player character A are 10, 30, and 20, respectively, and corresponding score weights are 3, 2, and 1, respectively, then the score is $10\times3+30\times2+20\times1=110$.

In addition to this, a plurality of score-related tasks may be preset in this embodiment, and each of the score-related tasks corresponds to a combat capability value. Each time the player character completes a task, the combat capability value corresponding to this task may be increased. For example, the first character camp refreshes daily tasks every day, with 100 score values for each daily task and 10 daily tasks per day, and one player character thus contributes a maximum of $100\times10=1000$ score values per day.

The season progress condition may be related to the camp data of the first character camp only, the camp data of the second character camp only, or both the camp data of the first character camp and the camp data of the second character camp, which is related to the way to play the game and is not limited here.

In addition, after the gaming data information in the current game season satisfies the preset season progress condition, voting may be conducted by at least part of the player characters to determine whether to open the preset gaming system, and only if the vote exceeds a certain percentage, the preset gaming system can be opened. Herein, the part of the player characters may be player characters that satisfy certain conditions, for example, grade conditions, score conditions, etc.

For example, in this embodiment, whether to open the preset gaming system may be determined through the following steps A1 to A2.

At step A1, a preset season decision entrance is opened to the player character having the first identity and/or the player character having the second identity in response to the gaming data information in the current game season satisfying the preset season progress condition, and decision information, submitted by the player character having the first identity and/or the player character having the second identity through the season decision entrance, is obtained.

The season decision entrance may be understood as an entrance for the player character to conduct voting. For example, it may be predetermined that events are held every Wednesday and Friday, player characters participating in each event are counted, and the season decision entrance may be opened every Sunday for the player characters participating in the event this week; alternatively, events may be held every Wednesday and Friday, and the season decision entrance may be opened for player characters participating in the event after each event ends.

At step A2, in response to the decision information satisfying a preset season decision condition, the opening condition of the preset gaming system is determined, and the target player characters for entering the preset gaming system are determined from the player characters.

The player character may submit the decision information through the season decision entrance. In some embodiments, the submitted decision information may indicate that the player character agrees or objects to open the preset gaming system. The server determines whether to open the preset gaming system based on the collected character information and determines the target player characters for entering the preset gaming system.

The season decision condition generally includes a number of the game player, indicated to agree to open the preset gaming system, exceeding a preset opening threshold. The opening threshold may be a specific number threshold or a ratio threshold. For example, the number of the game player agreeing to open the preset gaming system exceeds 1,000, or, the number of the game player agreeing to open the preset gaming system exceeds 60% of all player characters submitting the decision information.

As an example, the decision information is counted after the event held every Wednesday and Friday ends, and as long as the decision information satisfies the preset season decision condition one time, the preset gaming system may be opened. Another example is to summarize the weekly counted decision information, and if the summarized decision information satisfies the preset season decision condition, the preset gaming system may be opened.

Of course, instead of opening the preset gaming system immediately after the decision information satisfies the preset season decision condition, the opening condition of the preset gaming system is determined, and the preset gaming system may be opened when the player character satisfies the opening condition.

In some embodiments, the opening condition of the preset gaming system at least includes one of: a number of player characters accommodated by the preset gaming system, an opening time of the preset gaming system, or a gaming rule of the preset gaming system.

The aforementioned opening condition may generally be a designated opening time, the number of the accommodated player characters, a preset gaming rule, etc. That is to say, the preset gaming system may not be opened until the designated opening time (e.g., after the decision information satisfies the preset season decision condition for a designated number of days). Alternatively, the preset gaming system may not be opened until the number of the accommodated player characters is satisfied. Alternatively, the preset gaming system may not be opened until game characters are in the preset gaming rule.

In summary, if the server determines, in response to the gaming data information in the current game season satisfying the preset season progress condition, that the preset gaming system can be opened, then the enrollment request for the preset gaming system sent by player characters may be received.

At step S304, the target player characters for entering the preset gaming system are determined from the player characters sending the enrollment request.

Generally speaking, player characters that can be accommodated by the preset gaming system are limited, and the number of the player characters sending the enrollment request may generally be larger than the number of the player characters that can be accommodated by the preset gaming system, so it is necessary to determine the target player characters for entering the preset gaming system from the player characters sending the enrollment request.

In some embodiments, the target player characters may be selected by a designated player, for example, through the following manner: obtaining first selection information of a designated player having the first identity, and selecting a first number of the target player character having the first identity from the player characters having the first identity; and obtaining second selection information of a designated player having the second identity, and selecting a second number of the target player character having the second identity from the player characters having the second identity.

The designated player may be understood as a camp leader (which may be referred to as a president) of the camp. If there are a plurality of sub-camps in the camp, the designated player may also be understood as a camp leader (which may also be referred to as a president) of the sub-camp. It should be noted that the character camp may or may not include sub-camps, and no limitations are made here.

In some embodiments, taking the first character camp as an example, the first character camp includes at least one first sub-camp, and each first sub-camp is provided with a sub-camp leader. The target player characters for entering the preset gaming system may be determined through the following manner: determining a season progress score of each first sub-camp; determining, based on the season progress score of the first sub-camp, a designated number of a first target sub-camp from the first sub-camp; and determining a player character in the first target sub-camp as the target player character for entering the preset gaming system.

It has been mentioned above that the player character may complete tasks to obtain the score, and the server may count the sum of the scores of the player characters of each first sub-camp as the season progress score of the first sub-camp, select a designated number of the first target sub-camp whose season progress score satisfies a condition, and determine the player character in the first target sub-camp as the target player character for entering the preset gaming system. The aforesaid condition may be a designated number of the first sub-camp whose season progress score is top-ranked, or may be the first sub-camp with a season progress score exceeding a designated threshold.

The target player character may be determined by the sub-camp leader through the following manner: receiving the first selection information sent by a terminal device of a sub-camp leader of the first target sub-camp, and selecting the first number of the target player character having the first identity from the first target sub-camp.

Each first target sub-camp may be provided with a sub-camp leader. The server may select, based on the first selection information sent by the terminal device of the sub-camp leader, the first number of the target player character having the first identity from each first target sub-camp.

Furthermore, the second character camp may also include at least one second sub-camp, and each second sub-camp is provided with a sub-camp leader. The target player characters for entering the preset gaming system may be determined through the following manner: determining a season progress score of each second sub-camp; determining, based on the season progress score of the second sub-camp, a designated number of a second target sub-camp from the second sub-camp; and determining a player character in the second target sub-camp as the target player character for entering the preset gaming system.

The target player character may be determined by the sub-camp leader through the following manner: receiving the second selection information sent by a terminal device of a sub-camp leader of the second target sub-camp, and selecting the second number of the target player character having the second identity from the second target sub-camp.

The manner of selecting the second target sub-camp from the second character camp, and the manner of selecting the target player character by the sub-camp leader of the second target sub-camp may be the same as or similar to the manner of selecting the first target sub-camp from the first character camp, and the manner of selecting the target player character by the sub-camp leader of the first target sub-camp, respectively, and will not be further described herein.

In some embodiments, apart from the above-described manner of determining the target player characters for entering the preset gaming system by the designated player, the target player characters may be determined in a random manner, e.g., the preset gaming system determines the target player characters, for entering the preset gaming system, from the player characters in a random manner. That is, the preset gaming system randomly selects the target player characters for entering the preset gaming system from all player characters that send the access request.

At step S306, after an opening condition of the preset gaming system is satisfied, the target player character is accepted to access the preset gaming system. The preset gaming system is used for providing a battle environment for a battle between the target player character having the first identity and the target player character having the second identity.

In some embodiments, after the opening condition of the preset gaming system is satisfied, the server may receive a request of the player character for accessing the preset gaming system, and authenticate the request. Only the request of the target player character for accessing the preset gaming system may be accepted. For example, the sever may receive an access request sent by the player character, determine, based on the access request, whether the player character belongs to the target player characters, and if the player character belongs to the target player characters, the server may accept the target player character to access the preset gaming system.

Specifically, the server may store a list of the target player characters, and then match the player character sending the access request with the player characters of the list. Only when the player character sending the access request is within the list, the access request may be accepted, and the player character sending the access request may be determined as the target player character.

The preset gaming system in this embodiment may provide a battle environment for a battle between the target player character having the first identity and the target player character having the second identity, so that the target player character having the first identity and the target player character having the second identity may battle in this battle environment. In some embodiments, the battle in the battle environment may be conducted in the form of sub-camps.

This embodiment is illustrated with the first character camp including the sub-camp and the second character camp not including the sub-camp. For example, the method further includes determining a battle relationship, between each one of the first target sub-camp and the second character camp in the preset gaming system, in the battle environment.

As an example, there may be 10 first target sub-camps, referred to as first target sub-camps A-J, that may participate in the battle environment. Each sub-camp of the first target sub-camps A-J may form a team with 8 members each, totaling 10 teams (such as teams a-j) to participate in the battle. Taking the first target sub-camp A as an example, after determining to open the preset gaming system, player characters of the first target sub-camp A may enroll to enter the preset gaming system. After enrollment, the sub-camp leader of the first target sub-camp A selects 10 player characters from these player characters enrolling to enter the preset gaming system as the target player characters to participate in the battle. Alternatively, the target player characters may also be selected from players who have not enrolled.

In the second character camp, 80 player characters may be selected by the camp leader of the second character camp as the target player characters to form 10 teams with 8 members each (e.g., teams a'-j') to battle in the battle environment described above.

At step S308, season settlement is controlled to perform for the current game season in response to a result of the battle, between the target player character having the first identity and the target player character having the second identity in the preset gaming system, in the battle environment satisfying a preset settlement condition.

The game in the preset gaming system in this embodiment may be played in stages, and the settlement condition described above may be that the first character camp wins in each stage. In some embodiments, the result of the battle, between each one of the first target sub-camp and each one of the second character camp in the preset gaming system, in the battle environment may be received, and a winning rate for each stage is determined based on the result of the battle.

For example, the first stage belongs to the multiplayer online battle arena (MOBA) gameplay, and the first character camp and the second character camp are in a 10 vs. 10 battle, for example, team a vs team a', team b vs. team b', . . . , a total of 10 battles are played simultaneously. The two opposing sides are determined by providing 20 window seats, the team of the first character camp may choose one of the 10 window seats in the first column to "take a seat", the team of the second character camp may choose one of the 10 window seats in the second column to "take a seat". The window seats of the two opposing sides opposite to each other.

In this embodiment, the first character camp may act as the attacking side, and the second character camp may act as the defending side. In the battle environment, the team of the first character camp may attack the team of the second character camp in one direction, the two sides may meet and have a battle, and a player character may be resurrected after a preset period of time when the player character dies during the battle. When the first character camp satisfies the condition such as the number of kills, destroying the defense building of the second character camp, etc. within a preset time period, the first character camp will win the battle; otherwise, the second character camp will win.

In some embodiments, the preset settlement condition described above include: a number of the first target sub-camp that wins the battle exceeding a preset first number threshold or a preset first ratio threshold. For example, when the winning rate of the first character camp exceeds 50% (i.e., the first character camp wins any 5 battles), it is judged that the first character camp has won the first stage, and the second stage is to be entered; otherwise, the first character camp is judged to have failed, and the season settlement is not performed.

In the second stage, the first character camp may select 40 target player characters from the team that has won in the first stage to participate in the battle, and the second character camp may have its camp leader respond to the battle. The specific manner may be as follows: various battle attributes of the camp leader of the second character camp are substantially enhanced to battle against the 40 target player characters of the first character camp; if the camp leader of the second character camp is defeated, the battle continues among the surviving target player characters of the first character camp until the last surviving person. In this case, no battle may take place among the target player characters of the first character camp until the camp of the second character camp has been defeated. If all 40 target player characters of the first character camp are defeated, the second character camp is victorious, and settlement is not performed for the current game season.

At this time, settlement may be performed for the current game season. In some embodiments, the season settlement includes: modifying an identity attribute of at least part of the target player characters. That is, converting the identity attribute of at least part of the target player characters from the first identity to the second identity, and/or, converting the identity attribute of at least part of the target player characters from the second identity to the first identity.

In some embodiments, part of the player characters having the first identity may be moved to the second character camp; and/or, part of the player characters having the second identity may be moved to the first character camp.

For example, in the second stage, all members of the sub-camp that the last surviving target player character (i.e., the player character having the first identity) of the first character camp belongs to become player characters of the second character camp for the new season, and the sub-camp leader of that sub-camp becomes the leader of the second character camp for the new season; meanwhile, all of the failed player characters of the second character camp may be moved to the first character camp.

In some embodiments, the method provided by the embodiments of the present disclosure may also perform spectating for the battle of the preset gaming system. For example, the above method further includes: after the opening condition of the preset gaming system is satisfied, providing, in response to a spectating request for the battle sent by a gaming terminal corresponding to a player character, to the player character sending the spectating request, data of the battle between the target player character having the first identity and the target player character having the second identity.

The server may receive, after the opening condition of the preset gaming system is satisfied, the spectating request for the battle sent by the gaming terminal corresponding to the player character, and provide, for the gaming terminal corresponding to the player character that sends the spectating request, data for spectating. The data for spectating may include a spectating animation of the battle environment of the preset gaming system, and textual spectating information and score data of the preset gaming system.

In some embodiments, the server may delay sending the data for spectating to prevent the player from cheating by utilizing the data for spectating, e.g., providing, based on a preset spectating interval, to the player character sending the spectating request, the data of the battle between the target player character having the first identity and the target player character having the second identity.

The spectating interval should not be set too long, and may be set to 5-10 minutes, so that the player character sending the spectating request may delay spectating the battle for 5-10 minutes. The textual spectating information and score data may be set without a spectating interval, so that the player is informed of the general situation of the battle and the result of the battle as soon as possible.

In some embodiments, the server may provide the player character sending the spectating request with the data of the battle from a perspective of the character of the corresponding character camp, e.g., providing, to the player character of the first identity camp among the player character sending the spectating request, the data of the battle from a perspective of the target player character of the first identity camp, and providing, to the player character of the second identity camp among the player character sending the spectating request, the data of the battle from a perspective of the target player character of the second identity camp.

If the player character sending the spectating request is a player character of the first identity camp, the server may provide the data of the battle from the perspective of the target player character of the first identity camp; if the player character sending the spectating request is a player character of the second identity camp, the server may provide the data of the battle from the perspective of the target player character of the second identity camp. The purpose of doing so is that the server may provide the player characters with the data of the battle of their own identity, which is convenient for the player character to spectate, and may also prevent the player character from cheating by utilizing the data of the battle of the opponent's identity.

In summary, the settlement method for the current game season in the embodiments of the present disclosure realizes dynamic season settlement. The season settlement can be performed before the feeling of freshness of the player is reduced, and thus preventing losing players and preventing the server from being consumed for nothing.

Corresponding to the above method embodiments, an embodiment of the present disclosure provides an apparatus for processing information in a game. The game includes a first character camp and a second character camp. The first character camp includes one or more player characters having a first identity. The second character camp includes one or more player characters having a second identity. As shown in a schematic structural diagram of an apparatus for processing information in a game shown in FIG. 4, the apparatus for processing the information in the game includes a target player character determination module 41, an access module of the preset gaming system 42 and a current game season settlement module 43.

The target player character determination module 41 is configured to determine, in response to gaming data information in a current game season satisfying a preset season progress condition, target player characters, for entering a preset gaming system, from the player characters. The target player characters include a target player character having the first identity and a target player character having the second identity.

The access module of the preset gaming system 42 is configured to accept, after an opening condition of the preset gaming system is satisfied, the target player character to access the preset gaming system. The preset gaming system is used for providing a battle environment for a battle between the target player character having the first identity and the target player character having the second identity.

The current game season settlement module 43 is configured to control to perform season settlement for the current game season in response to a result of the battle, between the target player character having the first identity and the target player character having the second identity in the preset gaming system, in the battle environment satisfying a preset settlement condition.

In the apparatus for processing the information in the game provided by the embodiments of the present disclosure, the target player characters for entering the preset gaming system are determined from the player characters in response to the gaming data information in the current game season satisfying the preset season progress condition; after the opening condition of the preset gaming system is satisfied, the target player character is accepted to access the preset gaming system; and the season settlement is controlled to perform for the current game season in response to the result of the battle, between the target player character having the first identity and the target player character having the second identity in the preset gaming system, in the battle environment satisfying a preset settlement condition.

In this embodiment, the target player characters may be determined after the gaming data information satisfies the preset season progress condition, and the season settlement may be controlled to perform for the current game season when the result of the battle of the target player character in the preset gaming system satisfies the preset settlement condition, thus realizing dynamic season settlement. The start time and end time of each season may be determined according to the result of the battle of the target player character in the preset gaming system, and are not timed or periodic. The season may be terminated before the feeling of freshness of the player for the current season is reduced, so as to improve the experience of the player and the game liveness, make the player stay for a long period of time, reduce the likelihood of losing players, and prevent the game server from being consumed for nothing.

The season progress condition described above at least includes one of: a duration of the season exceeding a first threshold; a number of player characters with a grade greater than a preset grade threshold exceeding a second threshold; an average grade of the player characters exceeding a third threshold; a completion progress of a target task of the game exceeding a fourth threshold; or camp data of the first character camp and/or the second character camp satisfying a preset condition.

The gaming data information described above includes gaming data information of at least part of the player characters.

The target player character determination module 41 described above is specifically configured to: receive an enrollment request for the preset gaming system sent by player characters; and determine, from the player characters sending the enrollment request, the target player characters for entering the preset gaming system.

The target player character determination module 41 described above is specifically configured to: obtain first selection information of a designated player having the first identity, and select a first number of the target player character having the first identity from the player characters having the first identity; and obtain second selection information of a designated player having the second identity, and select a second number of the target player character having the second identity from the player characters having the second identity.

The first character camp described above includes at least one first sub-camp, and each first sub-camp is provided with a sub-camp leader. The target player character determination module 41 described above is specifically configured to: determine a season progress score of each first sub-camp; determine, based on the season progress score of the first sub-camp, a designated number of a first target sub-camp from the first sub-camp; and determine a player character in the first target sub-camp as the target player character for entering the preset gaming system. The target player character determination module 41 described above is specifically configured to: receive the first selection information sent by a terminal device of a sub-camp leader of the first target sub-camp, and select the first number of the target player character having the first identity from the first target sub-camp.

The second character camp described above includes at least one second sub-camp, and each second sub-camp is provided with a sub-camp leader. The target player character determination module 41 described above is specifically configured to: determine a season progress score of each second sub-camp; determine, based on the season progress score of the second sub-camp, a designated number of a second target sub-camp from the second sub-camp; and determine a player character in the second target sub-camp as the target player character for entering the preset gaming system. The target player character determination module 41 described above is specifically configured to: receive the second selection information sent by a terminal device of a sub-camp leader of the second target sub-camp, and select the second number of the target player character having the second identity from the second target sub-camp.

The target player character determination module 41 described above is specifically configured to: determine, by the preset gaming system in a random manner, the target player characters, for entering the preset gaming system, from the player characters.

The opening condition of the preset gaming system described above at least includes one of: a number of player characters accommodated by the preset gaming system; an opening time of the preset gaming system; or a gaming rule of the preset gaming system.

The access module of the preset gaming system 42 described above is specifically configured to: receive an access request sent by the player character; determine, based on the access request, whether the player character belongs to the target player characters; and if the player character belongs to the target player characters, accept the target player character to access the preset gaming system.

The access module of the preset gaming system 42 described above is further configured to: determine a battle relationship, between each one of the first target sub-camp and the second character camp in the preset gaming system, in the battle environment.

The current game season settlement module 43 described above is further configured to: receive the result of the battle, between each one of the first target sub-camp and the second character camp in the preset gaming system, in the battle environment.

The preset settlement condition described above includes: a number of the first target sub-camp that wins the battle exceeding a preset first number threshold or a preset first ratio threshold.

The target player character determination module 41 described above is specifically configured to: open, in response to the gaming data information in the current game season satisfying the preset season progress condition, a preset season decision entrance to the player character having the first identity and/or the player character having the second identity, and obtain decision information submitted, by the player character having the first identity and/or the player character having the second identity, through the season decision entrance; and in response to the decision information satisfying a preset season decision condition, determine the opening condition of the preset gaming system, and determining the target player characters, for entering the preset gaming system, from the player characters.

The decision information described above indicates that the player character agrees or objects to open the preset gaming system. The season decision condition includes a number of the game player, indicated to agree to open the preset gaming system, exceeding a preset opening threshold.

Figure 5:
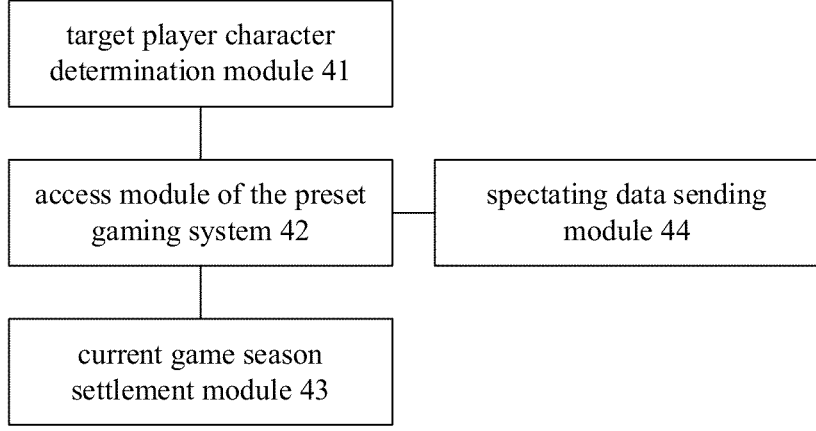
FIG. 5 is a schematic structural diagram of another apparatus for processing information in a game provided by an embodiment of the present disclosure.

As shown in a schematic structural diagram of another apparatus for processing information in a game shown in FIG. 5, the apparatus for processing the information in the game includes a spectating data sending module 44 connected to the access module of the preset gaming system 42. The spectating data sending module 44 is configured to provide, in response to a spectating request for the battle sent by a gaming terminal corresponding to a player character, to the player character sending the spectating request, data of the battle between the target player character having the first identity and the target player character having the second identity.

The spectating data sending module 44 described above is specifically configured to provide, based on a preset spectating interval, to the player character sending the spectating request, the data of the battle between the target player character having the first identity and the target player character having the second identity.

The spectating data sending module 44 described above is specifically configured to: provide, to the player character of the first identity camp among the player character sending the spectating request, the data of the battle from a perspective of the target player character of the first identity camp; and provide, to the player character of the second identity camp among the player character sending the spectating request, the data of the battle from a perspective of the target player character of the second identity camp.

The season settlement described above includes modifying an identity attribute of at least part of the target player characters.

The current game season settlement module 43 described above is further configured to: move part of the player characters having the first identity to the second character camp; and/or, move part of the player characters having the second identity to the first character camp.

The apparatus for processing the information in the game provided by the embodiments of the present disclosure has the same technical features as the method for processing the information in the game provided by the above embodiments, and therefore can also solve the same technical problems and achieve the same technical effects.

An embodiment of the present disclosure provides an electronic device configured to perform the method for processing the information in the game described above. As shown in a schematic structural diagram of an electronic device shown in FIG. 6, the electronic device includes a processor 101 and a memory 100. The memory 100 is configured to store one or more computer instructions. The processor 101, through executing the one or more computer instructions, implements the method for processing the information in the game described above.

Figure 6:
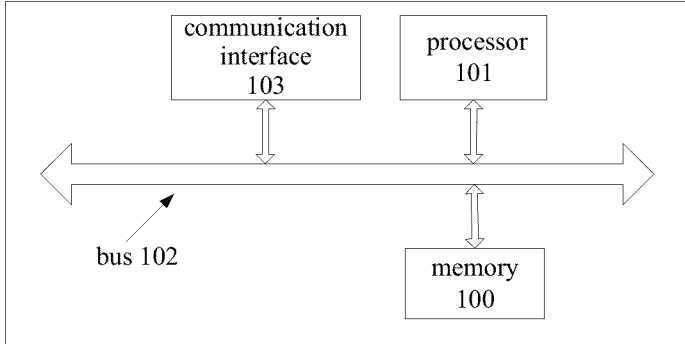
FIG. 6 is a schematic structural diagram of an electronic device provided by an embodiment of the present disclosure.

Furthermore, the electronic device shown in FIG. 6 further includes a bus 102 and a communication interface 103. The processor 101, the communication interface 103, and the memory 100 are connected via the bus 102.

The memory 100 may include a high-speed random access memory (RAM), or may also include a non-volatile memory, such as at least one disk memory. The communication connection between this system network element and at least one other network element is realized through at least one communication interface 103 (which may be wired or wireless), and the Internet, wide area network (WAN), local area network (LAN), metropolitan area network (MAN), etc. may be used. The bus 102 may be an ISA bus, a PCI bus, or an EISA bus, etc. The bus may be categorized as an address bus, a data bus, a control bus, and the like. For ease of representation, only one bi-directional arrow is shown in FIG. 6 to represent the bus, but it does not indicate that there is only one bus or one type of bus.

The processor 101 may be an integrated circuit chip with signal processing capabilities. In implementation process, the steps of the method described above may be accomplished by integrated logic circuits in the form of hardware in the processor 101 or by instructions in the form of software. The above-described processor 101 may be a general-purpose processor, including a central processing unit (CPU), a network processor (NP), etc. The general-purpose processor may also be a digital signal processor (DSP), an application specific integrated circuit (ASIC), a field-programmable gate array (FPGA), or other programmable logic devices, discrete gates, transistor logic devices, or discrete hardware components. Various methods, steps, and logic block diagrams disclosed in the embodiments of the present disclosure may be implemented or performed by the processor. The general-purpose processor may be a microprocessor, or the processor may also be any conventional processor, etc. The steps of the methods disclosed in conjunction with the embodiments of the present disclosure may be directly embodied to be performed for completion by a hardware decoding processor, or to be performed for completion by a combination of hardware and software modules in the decoding processor. The software module may be located in a random memory, flash memory, read-only memory, programmable read-only memory, an electrically erasable programmable memory, register, and other storage medium well established in the art. The storage medium is located in the memory 100, and the processor 101 reads the information in the memory 100 to accomplish the steps of the method of the preceding embodiments in conjunction with the hardware.

An embodiment of the present disclosure also provides a computer-readable storage medium. The computer-readable storage medium stores a computer-executable instruction. The computer-executable instruction, when scheduled and executed by a processor, causes the processor to implement the steps of the method for processing the information in the game described above, and the specific implementation may be seen in the method embodiments, which will not be further described herein.

The computer program product of the method and apparatus for processing the information in the game and the electronic device provided by the embodiments of the present disclosure includes a computer-readable storage medium storing program code. Instructions included in the program code may be used for performing the method in the preceding method embodiments, and the specific implementation may be seen in the method embodiments, which will not be further described herein.

Those skilled in the art can clearly understand that for the convenience and conciseness of the description, the specific working process of the system and/or apparatus described above may refer to the corresponding process in the aforementioned method embodiments, and will not be repeated herein.

Furthermore, in the description of the embodiments of the present disclosure, the terms "mounting", "connecting", and "connected" should be understood broadly, unless otherwise expressly specified and limited. For example, the connection may be a fixed connection, a detachable connection, or an integrated connection; the connection may be a mechanical connection or an electrical connection; the connection may be a direct connection or an indirect connection through an intermediate medium; or the connection may be a communication within two elements. For those ordinary skilled in the art, the specific meaning of the above terms in the present disclosure may be understood in specific cases.

If the function is implemented in the form of a software functional unit and sold or used as an independent product, it may be stored on a computer-readable storage medium. Based on this understanding, the disclosed technical solutions, in essence, or the portion that contributes to the prior art or the portion of the technical solutions, may be embodied in the form of a software product. The computer software product is stored in a storage medium, including one or more instructions to enable a computer device (which may be a personal computer, electronic device, or network device, etc.) to perform all or part of the steps of the methods described in various embodiments of the present disclosure. The aforementioned storage medium includes: a USB flash drive, mobile hard drive, read only memory (ROM), random access memory (RAM), magnetic disk or optical disc, and other medium that may store program code.

In the description of the present disclosure, it should be noted that the orientation or position relationship indicated by the terms "center", "up", "down", "left", "right", "vertical", "horizontal", "inside", "outside", etc. are based on the orientation and position relationship shown in the accompanying drawings, which are only for the purpose of describing the present disclosure and simplifying the description, rather than indicating or implying that the apparatus or components referred to must have a specific orientation, or be constructed and operated in a specific orientation, therefore these terms cannot be understood as a limitation to the present disclosure. In addition, the terms "first", "second", and "third" are only used for descriptive purposes only and are not to be construed as indicating or implying relative importance.

Finally, it should be noted that the above embodiments are only the detailed description of the present disclosure, used for illustrating the technical solutions of the present disclosure, rather than limiting the present disclosure. The scope of protection of the present disclosure is not limited to this. Although detailed explanations of the present disclosure have been provided by referring to the aforementioned embodiments, those ordinary skilled in the art should understand that any person familiar with this technical field can, within the scope of the disclosed technology, modify the technical solutions recorded in the aforementioned embodiments or easily think of changes, or equivalently replace some of the technical features. These modifications, changes, or substitutions do not separate the essence of the corresponding technical solutions from the spirit and scope of the technical solutions of the embodiments of the present disclosure, and should be covered within the scope of protection of the present disclosure. Therefore, the scope of protection of the present disclosure shall be based on the scope of protection of the claims.

What is claimed is:

1. A method for processing information in a game, wherein the game runs on a cloud interaction system comprising a client device and a server, the client device is used for data reception, data transmission and presentation of a gaming footage, the server is configured to run a game program, and is used for receiving operation instruction from the client device, encoding and compressing data of the gaming footage, and returning the data to the client device, and wherein the game comprises player characters, the player characters comprise one or more first player characters and one or more second player characters, the first player characters belong to a first character camp and have a first identity, the second player characters belong to a second character camp and have a second identity, and the method comprises:

running a gaming content corresponding to a current game season on the server;

determining, in response to gaming data information in the current game season satisfying a preset season progress condition, target player characters, for entering a preset gaming system, from the player characters, wherein the target player characters comprise a first target player character having the first identity and a second target player character having the second identity;

accepting, in response to an opening condition of the preset gaming system being satisfied, the target player character to access the preset gaming system, wherein the preset gaming system is used for providing a battle environment for a battle between the first target player character and the second target player character; and performing season settlement for the current game season in response to a result of the battle satisfying a preset settlement condition, to run a gaming content corresponding to a preset gaming system for a new gaming season on the server to complete game season switching before a predetermined timing or period.

2. The method according to claim 1, wherein the season progress condition at least comprises one of:

a duration of the season exceeding a first threshold;

a number of player characters with a grade greater than a preset grade threshold exceeding a second threshold;

an average grade of the player characters exceeding a third threshold;

a completion progress of a target task of the game exceeding a fourth threshold; or camp data of at least one of the first character camp or the second character camp satisfying a preset condition.

3. The method according to claim 1, wherein the gaming data information comprises gaming data information of at least part of the player characters.

4. The method according to claim 1, wherein the determining the target player characters comprises:

receiving an enrollment request for the preset gaming system sent by player characters; and determining, from the player characters sending the enrollment request, the target player characters for entering the preset gaming system.

5. The method according to claim 1, wherein the determining the target player characters comprises:

obtaining first selection information of a designated player having the first identity, and selecting, based on the first selection information, a first number of the first target player character from the first player characters; and obtaining second selection information of a designated player having the second identity, and selecting, based on the second selection information, a second number of the second target player character from the second player characters.

6. The method according to claim 5, wherein the first character camp comprises at least one first sub-camp, and each one of the at least one first sub-camp is provided with a sub-camp leader;

the determining the target player characters comprises:

determining a season progress score of each one of the at least one first sub-camp;

determining, based on the season progress score of the first sub-camp, a designated number of a first target sub-camp from the at least one first sub-camp; and determining a player character in the first target sub-camp as the first target player character; and the obtaining the first selection information comprises receiving the first selection information sent by a terminal device corresponding to a sub-camp leader of the first target sub-camp, and the selecting the first number of the first target player character from the first player characters comprises selecting the first number of the first target player character from the first target sub-camp.

7. The method according to claim 5, wherein the second character camp comprises at least one second sub-camp, and each one of the at least one second sub-camp is provided with a sub-camp leader;

wherein the determining the target player characters comprises:

determining a season progress score of each of the at least one second sub-camp;

determining, based on the season progress score of the second sub-camp, a designated number of a second target sub-camp from the at least one second sub-camp; and determining a player character in the second target sub-camp as the second target player character; and wherein the obtaining the second selection information comprises receiving the second selection information sent by a terminal device corresponding to a sub-camp leader of the second target sub-camp, and the selecting the second number of the second target player character from the second player characters comprises selecting the second number of the second target player character from the second target sub-camp.

8. The method according to claim 1, wherein the determining the target player characters comprises:

determining the target player characters from the player characters in a random manner.

9. The method according to claim 1, wherein the opening condition of the preset gaming system at least indicates one of:

a number of player characters accommodated by the preset gaming system;

an opening time of the preset gaming system; or a gaming rule of the preset gaming system.

10. The method according to claim 1, wherein the accepting the target player character to access the preset gaming system comprises:

receiving an access request sent by a player character;

determining, based on the access request, whether the player character sending the access request belongs to the target player characters; and accepting the target player character to access the preset gaming system in response to determining that the player character sending the access request belongs to the target player characters.

11. The method according to claim 6, further comprising: determining a battle relationship between each one of the first target sub-camp and the second character camp in the battle environment.

12. The method according to claim 6, further comprising: receiving the result of the battle between each one of the first target sub-camp and the second character camp in the battle environment.

13. The method according to claim 12, wherein the preset settlement condition comprises:

a number of the first target sub-camp that wins the battle exceeding a preset first number threshold or occupying a ratio greater than a preset first ratio threshold.

14. The method according to claim 1, wherein the determining the target player characters comprises:

opening a preset season decision entrance to at least one of the first player character or the second player character, and obtaining decision information submitted, by the at least one of the first player character or the second player character, through the season decision entrance; and in response to the decision information satisfying a preset season decision condition, determining the opening condition of the preset gaming system, and determining the target player characters.

15. The method according to claim 14, wherein the decision information indicates that the player character agrees or objects to open the preset gaming system; and the season decision condition comprises a number of the player character, indicated to agree to open the preset gaming system, exceeding a preset opening threshold.

16. The method according to claim 1, further comprising:

providing, in response to a spectating request for the battle sent by a terminal device corresponding to a player character, data of the battle to the player character sending the spectating request.

17. The method according to claim 16, wherein the providing the data of the battle to the player character sending the spectating request comprises:

providing, based on a preset spectating interval, the data of the battle to the player character sending the spectating request.

18. The method according to claim 16, wherein the providing the data of the battle to the player character sending the spectating request comprises:

providing, to the player character of the first character camp, the data of the battle from a perspective of the first target player character; and providing, to the player character of the second character camp, the data of the battle from a perspective of the second target player character.

19. The method according to claim 1, wherein the season settlement comprises modifying an identity attribute of at least part of the target player characters; wherein the modifying the identity attribute of the at least part of the target player characters comprises at least one of:

moving part of the first player characters to the second character camp; or moving part of the second player characters to the first character camp.

20. An electronic device, applied to a server of a cloud interaction system on which a game runs, wherein the cloud interaction system further comprises a client device, the client device is used for data reception, data transmission and presentation of a gaming footage, the server is configured to run a game program, and is used for receiving operation instruction from the client device, encoding and compressing data of the gaming footage, and returning the data to the client device, the electronic device comprising: a processing apparatus and a storage apparatus; wherein the storage apparatus stores a computer program, and the computer program, when executed by the processing apparatus, causes the electronic device to perform a method for processing information in a game, wherein the game comprises player characters, the player characters comprise one or more first player characters and one or more second player characters, the first player characters belong to a first character camp and have a first identity, the second player characters belong to a second character camp and have a second identity, and the method comprises:

running a gaming content corresponding to a current game season on the server;

determine, in response to gaming data information in the current game season satisfying a preset season progress condition, target player characters, for entering a preset gaming system, from the player characters, wherein the target player characters comprise a first target player character having the first identity and a second target player character having the second identity; accept, in response to an opening condition of the preset gaming system being satisfied, the target player character to access the preset gaming system, wherein the preset gaming system is used for providing a battle environment for a battle between the first target player character and the second target player character; and perform season settlement for the current game season in response to a result of the battle satisfying a preset settlement condition, to run a gaming content corresponding to a preset gaming system for a new gaming season on the server to complete game season switching before a predetermined timing or period.

*    *    *    *    *